Patented May 20, 1941

2,242,760

UNITED STATES PATENT OFFICE 2,242,760

ORGANIC DYESTUFFS AND PROCESS OF PRODUCING SAME

Conrad Schoeller, Gustav Schwen, and Georg Kraemer, Ludwigshafen-on-the-Rhine, Germany, assignors to General Aniline & Film Corporation, a corporation of Delaware No Drawing. Application February 25, 1938, Serial No. 192,504. In Germany November 5, 1936

18 Claims. (Cl. 260—377)

The present invention relates to organic dyestuffs and a process of producing same.

This application is a continuation-in-part of our application Ser. No. 713,604, filed on March 1st, 1934, now Patent No. 2,131,712, issued September 27, 1938. In the latter application it is described that valuable organic dyestuffs are obtained by causing at any stage of the production of a dyestuff aliphatic oxygen-containing compounds containing at least 2 carbon atoms in the molecule and capable of condensing with the formation of ether-oxygen bridges and hydroxy groups, to act on organic dyestuffs or on starting materials suitable in the production of organic dyestuffs and finally forming part of the dyestuff molecule or on dyestuff components which finally form part of the molecule of the dyestuff, which compounds contain at least one reactive hydrogen atom in the molecule, in such amounts that the reaction product contains per molecule at least one radical of at least 4 carbon atoms containing at least one ether-oxygen bridge and at least one free hydroxyl group.

Among the numerous dyestuffs and starting materials suitable in the production of dyestuffs and dyestuff components referred to in the said application there are also mentioned amino anthraquinones, such as α- and β-aminoanthraquinone, 1.4- and 1.5-diaminoanthraquinone and dihydroxy- and trihydroxy-anthraquinones. As aliphatic oxygen-containing compounds of the type defined above there are mentioned the alkylene oxides, such as ethylene oxide, propylene oxide, ethylene glycol, propylene glycol, glycerine, glycol chlorhydrine, epichlorhydrine, 1.2- and 1.3-dichlorhydrine, tri- and tetraethylene glycol, polymerized glycerine and halogen compounds obtainable therefrom. As far as anthraquinone derivatives are concerned there has been specifically described the reaction of ethylene oxide on 1.4-diaminoanthraquinone.

In further working out the said process and studying the properties of the products we have now found that organic dyestuffs which are eminently suitable for dyeing acetate artificial silk are obtained by reacting a compound A—(X)$_n$ with a compound Y—(C$_2$H$_4$—O—)$_m$—C$_2$H$_4$OH (in which formulae A stands for an anthraquinone radical, X and Y for substituents capable of condensing with one another with the formation of a nitrogen or oxygen bridge, $m$ and $n$ for whole numbers from 1 to 4), the components being so selected that the final product contains at least one amino group. Speaking in greater detail X may be a halogen atom, a hydroxyl, an alkoxy, an amino, a nitro, a sulphonic acid or a carboxylic group including a substituted carboxylic group, such as a carboxylic halide group. Y may be a hydroxyl or an amino group or a halogen atom. The two components are so selected that they react with the formation of a bridge containing oxygen or nitrogen, for example an amino group, an ether group, a carboxylic ester or carbon amide group.

As suitable anthraquinone compounds there may be mentioned quinizarine, 1-amino-4-hydroxyanthraquinone, 1.4-diaminoanthraquinone, 1.4-diaminoanthraquinone-6-carboxylic acid, 1-amino-4-nitroanthraquinone - 2 - carboxylic acid chloride, 1.4-dibromanthraquinone, 1-methoxy-4 - nitroanthraquinone and 1 - methylamino- 4 - nitro-2-carboxylic acid chloride. As aliphatic components containing the ether-chain monoethylene- or di- or tri-ethylene glycol-monobeta-amino ethylether or di-, tri-, tetra- or pentaethylene glycol or the corresponding compounds in which one terminal OH-group is replaced by halogen may be employed. By suitable selection of the two components and the reaction conditions introduction of the aliphatic ether-chain in the desired position of the anthraquinone compound may be effected.

If for example mono-, di- or triethylene glycol-mono-beta-amino ethylether is employed the amino group readily reacts with hydroxyl, amino, nitro, alkoxy or sulpho groups or halogen atoms contained in the anthraquinone compound with the replacement of the latter substituents and the formation of amines containing the ether-chain attached to the amino nitrogen. When using di-, tri-, tetra- or penta-ethylene glycol esterification with anthraquinone carboxylic acids may readily be effected; this reaction is favored by the presence of zinc dust. The amino group or groups which are to be contained in the dyestuff may be present in the anthraquinone carboxylic acid from the beginning or may be formed, for example after the condensation, by the reduction of nitro groups. In the reaction of di-, tri- or tetra-ethylene glycol with suitable anthraquinone sulphonic acids, such as 1.4-diaminoanthraquinone-2-sulphonic acid, the sulphonic group is replaced by the radical of the said glycol which is attached to the anthraquinone radical by an ether-oxygen atom. If halogen-containing aliphatic components of the type defined above are employed, they can readily be reacted with the amino groups of anthraquinone compounds; furthermore the said halogen-containing compounds may be reacted with the hydroxyl groups of hydroxylated anthraquinones in the presence of alkali. If hydroxyl or amino groups contained in anthraquinone compounds are to be replaced by the radical —NH—(C$_2$H$_4$—O—)$_m$—C$_2$H$_4$—OH, it is advantageous to work in the presence of leuco-compounds of anthraquinone derivatives, for example in the presence of leuco-quinizarine or leuco-1-4-diamino anthraquinone.

From 1 to 4 ether-chains of the kind defined may be introduced into the anthraquinone compounds. The reaction may be carried out in the presence of diluents and/or catalysts, such as copper. If halogen is to be split off it is advantageous to work in the presence of acid-binding agents.

It is a special feature of the present process that the aliphatic ether-chain to be introduced into the anthraquinone compound is already contained in its definite form in the aliphatic starting component, while in the employment of ethylene oxide (which is disclosed in great detail in the aforementioned prior application) the said ether-chain is formed from several molecules of ethylene oxide during the reaction. In the present process the length of the ether-chain is well known and uniform products are formed which in many cases are crystalline and can be recovered in a simple manner, for example by filtering by suction. The new dyestuffs are distinguished by the fact that they allow of dyeing acetate artificial silk in an unexpectedly satisfactory manner.

One of the difficulties in the dyeing of acetate artificial silk is that many dyestuffs do not yield even dyeings on tightly woven acetate artificial silk fabrics and on special kinds of crêpes. Many dyestuffs free from this disadvantage possess the undesired property of migrating when applied to mixed fabrics of acetate and viscose artificial silk, which means that these dyestuffs have the tendency of leaving the acetate artificial silk fibres and going onto the viscose artificial silk fibres while the fabrics are hanging for the purpose of being dried.

The new dyestuffs excel in that they behave satisfactorily with respect to each of these circumstances. They readily dissolve in water, especially in the presence of dispersing agents. From the aqueous solutions to which preferably salts, such as ammonium chloride or Glauber's salt, are added the new dyestuffs go onto acetate artificial silk yielding clear dyeings of excellent fastness properties. For example the fastness to light and to wetting of such dyeings is superior to that of dyeings hitherto obtained with water-soluble anthraquinone dyestuffs. On account of their water-solubility the dyestuffs are suitable for dyeing from concentrated baths and in dyeing apparatus. Besides these valuable properties the new dyestuffs are distinguished by uniformly dyeing even such artificial silk fabrics which can usually be uniformly dyed only with difficulty on account of their tight structure and by not migrating when employed for dyeing mixed fabrics from acetate and viscose artificial silk. On account of the fact that the new dyestuffs possess these advantages altogether they are eminently suitable for dyeing acetate artificial silk materials.

The following examples will further illustrate the nature of this invention, but the invention is not restricted to these examples. The parts are by weight.

*Example 1*

14.7 parts of ethylene glycol-mono-beta-aminoethylether (obtainable by treating ethylene glycol-mono-beta-chlorethylether with alcoholic ammonia) are added at room temperature to a suspension of 20 parts of quinizarine and 4 parts of leuco-1.4-diaminoanthraquinone in 120 parts of isobutanol. The mixture obtained is heated to 60° C. which temperature is maintained for 2 hours. The mixture is then heated to boiling until unconverted initial material can no longer be detected. After cooling the reaction product forming beautiful blue needles is separated in the usual manner. It consists mainly of the compound corresponding to the formula

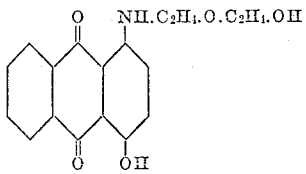

it is soluble in water, especially if dispersing agents are added and dyes acetate artificial silk from aqueous baths clear reddish-blue shades. The dyeings obtained possess good fastness properties. The dyestuff is distinguished by its capacity of dyeing even tightly woven fabrics of acetate silk very thoroughly and equally (also the inner parts thereof) and of not migrating when mixed fabrics of acetate and viscose artificial silk are dyed therewith.

If quinizarine is employed instead of the leuco-quinizarine and 7 parts of zinc dust (or the corresponding amount of sodium hydrosulphite) is added, the same dyestuff is obtained.

*Example 2*

72 parts of ethylene glycol-mono-beta-aminoethylether are added to a suspension of 50 parts of quinizarine and 10 parts of leuco-quinizarine in 300 parts of isobutanol. The mixture is heated to 60° C. while stirring, kept at this temperature for 2 hours and then heated to boiling under reflux until the formation of the dyestuff is completed. When the reaction mixture is cooled crystals separate out which are soluble in hot water yielding deep blue solutions (especially if dispersing agents are added). The compound corresponds probably to the following formula

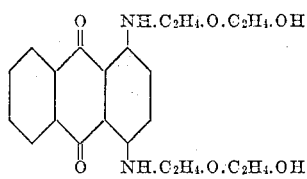

The compound dyes acetate silk clear blue shades and possesses similar valuable properties as the product described in Example 1.

If the proportion of the ethylene glycol-mono-beta-amino ethylether to quinizarine is decreased (but not to a proportion as low as that indicated in Example 1) mixtures of the two dyestuffs shown by the formulae in Example 1 and the present example are obtained. These mixtures yield very deep dyeings the reddish tinge of which is less than that of the dyestuff according to Example 1.

Instead of ethylene glycol-mono-beta-aminoethylether individual polyethylene glycol-beta-aminoethylethers or mixtures of some such with other amines, such as methylamine, may be employed.

If the process according to the first paragraph of this example is carried out while replacing the leuco-quinizarine by quinizarine and adding 7 parts of zinc dust or the corresponding amount of sodium hydrosulphite the same dyestuff as described in the said paragraph is obtained.

If instead of quinizarine the corresponding amounts of 1.4.5.8-tetrahydroxy anthraquinone and its leuco compound are employed, dyestuffs are formed which are also water-soluble and dye acetate silk beautiful bluish-green shades.

Example 3

10 parts of 1-amino-4-nitroanthraquinone-2-carboxylic acid chloride are heated together with a solution of 10 parts of mono-ethylene glycol-mono-beta-aminoethylether in 30 parts of water at from 90° to 100° C. until the formation of the carboxylic amide is finished. After cooling the orange-colored product which crystallizes out is filtered off by suction. The nitro group thereof is reduced by treating the compound, for example with sodium sulphite, the dyestuff of the formula

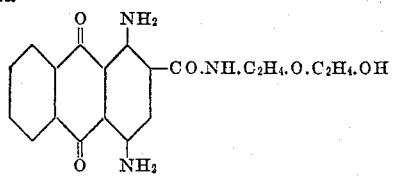

being formed.

Instead of mono ethylene glycol-mono-beta-aminoethylether there may be used di-, tri- or tetraethylene glycol - mono - beta - aminoethylether; these compounds are also employed in an excess over the theoretical amount. In this case compounds of the formula

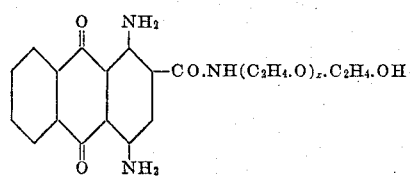

(wherein $x$ stands for 2, 3 or 4 respectively in dependence on the initial component employed), are formed. The dyestuffs which are very similar, are readily soluble in warm water giving blue solutions and dye acetate silk vivid blue shades. The fastness properties are excellent and the dyestuffs possess similar valuable properties as the product described in Example 1.

Example 4

15 parts of 1.4-diaminoanthraquinone-6-carboxylic acid and 150 parts of triethylene glycol are heated with 1 part of zinc dust in vacuo at 200° C. The water formed in the esterification is removed by a current of nitrogen. If unesterified carboxylic acid can no longer be detected the mass is poured into water. The whole is boiled up and small amounts of insoluble matter are removed by filtration. The dyestuff corresponding to the formula

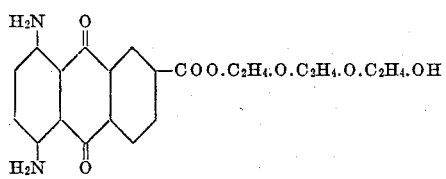

is salted out from the filtrate. It is readily soluble in water (especially if dispersing agents are added) and dyes acetate artificial silk from aqueous solutions deep violet shades. It possesses the valuable property of equally thoroughly dyeing tightly woven fabrics of acetate silk which otherwise can only be equally dyed with difficulty; furthermore the dyestuff does not migrate when mixed fabrics of acetate and viscose artificial silk are dyed therewith.

Example 5

10 parts of 1-amino-4-hydroxy anthraquinone-2-sulphonic acid sodium salt are added to a solution obtained by dissolving at from 80° to 100° C. 5 parts of sodium in 100 parts of triethylene glycol. The reaction mixture is then heated for from 1 to 2 hours at 150° C., cooled and added to water. By salting out with sodium chloride a valuable dyestuff is obtained which dyes acetate artificial silk pink shades from aqueous solutions. The dyestuff corresponds to the formula

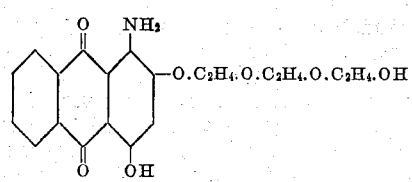

Example 6

A mixture of 5 parts of 1-amino-4-nitro-anthraquinone-2-carboxylic acid chloride, 50 parts of triethylene glycol and 5 parts of pyridine is heated for 1 hour at 95° C. The reaction mixture is poured into water and acidified with acetic acid. The triethylene glycol ester of 1-amino-4-nitroanthraquinone-2-carboxylic acid formed is filtered off by suction. By treating the said ester in glacial acetic acid solution with stannous chloride and hydrochloric acid a blue dyestuff is obtained which is soluble in hot water and dyes acetate artificial silk from aqueous solutions blue shades. The dyestuff corresponds to the following formula

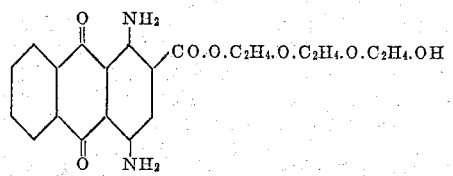

Example 7

A suspension of 6 parts of 1.4-diamino anthraquinone and 4 parts of potash in 40 parts of ethylene glycol mono-beta-chlor-ethylether is heated to boiling under reflux until 1.4-diamino anthraquinone can no longer be detected. The mixture is then diluted with large amounts of boiling water, freed from undissolved parts by filtration and allowed to cool. Beautiful crystals are formed which consist probably of the condensation product of equimolecular proportions of the two components; the compound is soluble in hot water and dyes acetate artificial silk clear bluish violet shades.

A dyestuff with similar properties is obtained if diethylene glycol-mono-beta-chlor-ethylether is employed instead of ethylene glycol-mono-beta-chlor-ethylether.

Example 8

A suspension of 20 parts of 1-nitro-anthraquinone-2-carboxylic acid chloride and 40 parts of ethylene glycol-mono-beta-amino ethylether in 60 parts of water is stirred at from 80° to 90° C. until a clear red solution is obtained which probably contains the condensation product formed by replacement of the nitro group and the chlorine atom in the carboxylic acid chloride group by the radical of the said amino ether. By salting out a red powder is obtained which readily dissolves in warm water giving a red solution. The dyestuff corresponds to the formula

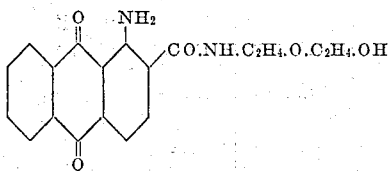

and dyes acetate artificial silk clear red shades.

*Example 9*

A mixture of 13.6 parts of leuco-1.4.5.6-tetrahydroxy anthraquinone, 100 parts of isobutyl alcohol and 15 parts of monoethylene glycol-beta-amino ethylether is heated to boiling for 6 hours while stirring. As soon as unconverted initial material can no longer be detected 100 parts of nitrobenzene are added; the temperature is raised to from 150° to 160° C. while distilling off the isobutyl alcohol. 0.5 part of piperidine is added at the said temperature which is maintained for an hour. The solvent is then removed by steam-distillation and the dyestuff separated in the usual manner. It dyes acetate artificial silk beautiful bluish-green shades.

What we claim is:

1. The process of producing dyestuffs for dyeing acetate artificial silk of the general formula:

$$A-(Z-(C_2H_4-O)_m-C_2H_4OH)_n$$

wherein A represents an anthraquinone radical, Z a member selected from the class consisting of —CO.NH— and —NH—, and wherein $m$ and $n$ represent whole numbers from 1 to 4; which comprises reacting a compound $A-(X)_n$ with a compound $H_2N-(C_2H_4-O)_m-C_2H_4OH$ (wherein A stands for an anthraquinone radical, X for substituents capable of reacting with the said amino compound with the formation of a bridge Z selected from the class consisting of the groups —CO.NH— and —NH—, and $m$ and $n$ for whole numbers from 1 to 4), the components being so selected that the final product contains at least one amino group directly attached to the anthraquinone nucleus.

2. The process of producing dyestuffs for dyeing acetate artificial silk of the general formula: $A-(Z-(C_2H_4-O)_m-C_2H_4OH)_n$ wherein A represents an anthraquinone radical, Z a member selected from the class consisting of —CO.NH— and —NH—, and wherein $m$ and $n$ represent whole numbers from 1 to 4, which comprises reacting a compound $A-(X)_n$ with a compound $H_2N-(C_2H_4-O)_m-C_2H_4OH$ (wherein A stands for an anthraquinone radical, X for substituents capable of reacting with the said amino compound with the formation of a bridge Z selected from the class consisting of the groups —CO.NH— and —NH—, and $m$ and $n$ for whole numbers from 1 to 4) in the presence of an inert diluent, the component being so selected that the final product contains at least one amino group directly attached to the anthraquinone nucleus.

3. The process of producing dyestuffs suitable for dyeing acetate artificial silk, which comprises reacting a compound corresponding to the general formula

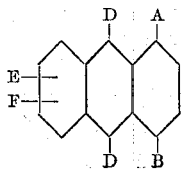

wherein A and B stand for radicals selected from the class consisting of the OH—, NH$_2$— and alkylated amino groups, D for substituents selected from the class consisting of OH— and O=, E and F for members selected from the class consisting of hydrogen atoms, OH, NH$_2$ and alkylated amino groups, with a compound of the general formula NH$_2$—(C$_2$H$_4$—O)$_m$—C$_2$H$_4$OH (wherein $m$ represents a whole number from 1 to 4) care being taken by an oxidizing process that in the final products the substituents D are O=.

4. The process of producing dyestuffs suitable for dyeing acetate artificial silk, which comprises reacting a compound corresponding to the general formula

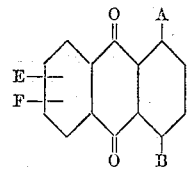

(wherein A and B stand for radicals selected from the class consisting of the OH—, NH$_2$— and alkylated amino groups and E and F for members selected from the class consisting of hydrogen atoms, OH—, NH$_2$— and alkylated amino groups) with a compound of the general formula NH$_2$—(C$_2$H$_4$—O)$_m$—C$_2$H$_4$OH (wherein $m$ represents a whole number from 1 to 4).

5. The process of producing dyestuffs suitable for dyeing acetate artificial silk, which comprises reacting a leuco compound corresponding to the general formula

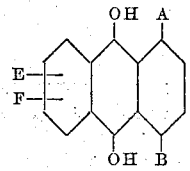

(wherein A and B stand for radicals selected from the class consisting of the OH—, NH$_2$— and alkylated amino groups and E and F for members selected from the class consisting of hydrogen atoms, OH—, NH$_2$— and alkylated amino groups) with a compound of the general formula NH$_2$—(C$_2$H$_4$—O)$_m$—C$_2$H$_4$OH (wherein $m$ represents a whole number from 1 to 4) and oxidizing the leuco-compound obtained to the corresponding dyestuff.

6. The process of producing dyestuffs suitable for dyeing acetate artificial silk, which comprises reacting a compound corresponding to the general formula

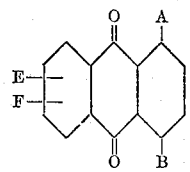

(wherein A and B stand for radicals selected from the class consisting of the OH—, NH$_2$— and alkylated amino groups and E and F for members selected from the class consisting of hydrogen atoms, OH—, NH$_2$— and alkylated amino groups) in the presence of a leuco-compound of a compound corresponding to the above formula, with a compound of the general formula NH$_2$—(C$_2$H$_4$—O)$_m$—C$_2$H$_4$OH (wherein $m$ represents a whole number from 1 to 4).

7. The process of producing dyestuffs suitable for dyeing acetate artificial silk, which comprises reacting 1.4-dihydroxy anthraquinone in the presence of 1.4-dihydroxy-leuco-anthraquinone with an amount of beta-amino-beta'-hydroxy-diethyl ether sufficient for replacing at least one hydroxyl group in the molecule of the said anthraquinone derivatives.

8. The process of producing dyestuffs suitable for dyeing acetate artificial silk, which comprises reacting 1.4-dihydroxy-leuco-anthraquinone with an amount of beta-amino-beta'-hydroxy-diethyl ether sufficient for replacing at least one hydroxyl group in the molecule of the said anthraquinone derivative and oxidizing the leuco-compound obtained to the corresponding dyestuff.

9. The process of producing dyestuffs suitable for dyeing acetate artificial silk, which comprises reacting a compound corresponding to the general formula A—CO—Z (wherein A stands for an anthraquinone radical substituted in at least one alpha-position by a substituent selected from the class consisting of amino groups, alkylated amino groups and groups capable of being readily converted into such groups selected from the class consisting of halogen atoms, nitro-, hydroxy-, and alkoxy-groups, and wherein Z stands for a substituent selected from the class consisting of hydroxyl and halogen) with a compound of the general formula $$H_2N—(C_2H_4—O)_m—C_2H_4OH$$

(wherein $m$ stands for a whole number from 1 to 4).

10. The process of producing dyestuffs suitable for dyeing acetate artificial silk, which comprises reacting a compound corresponding to the general formula

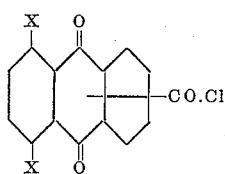

(wherein X stands for a substituent selected from the class consisting of amino groups and groups capable of being readily converted into amino groups selected from the class consisting of halogen atoms, nitro-, hydroxy-, and alkoxy-groups) with the compound corresponding to the formula $H_2N—(C_2H_4—O)_2—C_2H_4—OH$.

11. Dyestuffs suitable for dyeing acetate artificial silk corresponding to the general formula A—(Z—(C₂H₄—O)ₘ—C₂H₄—OH)ₙ (wherein A represents an anthraquinone radical, Z a member selected from the class consisting of the groups —CO—NH— and —NH—, and wherein $m$ and $n$ represent whole numbers from 1 to 4), the said dyestuffs containing at least one amino group in alpha-position.

12. Dyestuffs suitable for dyeing acetate artificial silk corresponding to the general formula

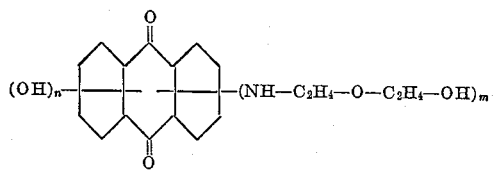

(wherein $n$ stands for a whole number from 1 to 3 inclusive and $m$ for a whole number from 1 to 2), the amino groups shown being attached to the anthraquinone radical in alpha-position.

13. Dyestuffs suitable for dyeing acetate artificial silk corresponding to the general formula

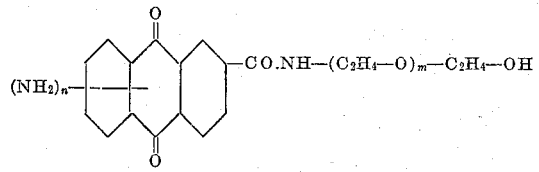

(wherein $m$ stands for a whole number from 1 to 4 and $n$ for a whole number from 1 to 2), the amino groups shown being attached to the anthraquinone radical in alpha-position.

14. The dyestuff suitable for dyeing acetate artificial silk corresponding to the formula

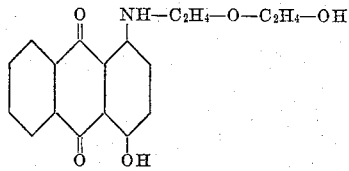

15. The dyestuff suitable for dyeing acetate artificial silk corresponding to the formula

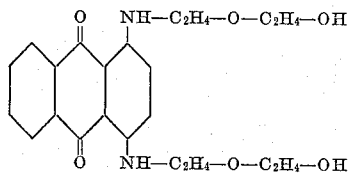

16. The dyestuff suitable for dyeing acetate artificial silk corresponding to the formula

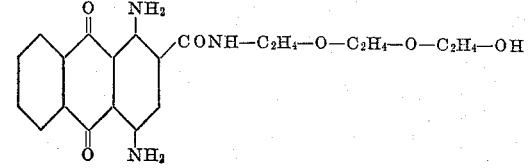

17. A mixture of the two dyestuffs suitable for dyeing acetate artificial silk corresponding to the formula

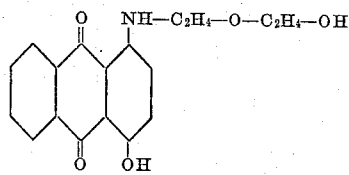

and

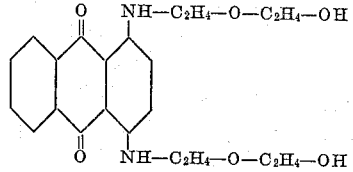

18. Dyestuffs suitable for dyeing acetate artificial silk corresponding to the general formula:

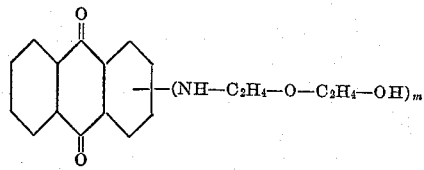

wherein $m$ stands for a whole number from 1 to 2, the amino groups shown being attached to the anthraquinone radical in alpha-position.

CONRAD SCHOELLER.
GUSTAV SCHWEN.
GEORG KRAEMER.